United States Patent [19]

Boivin

[11] Patent Number: 5,988,972
[45] Date of Patent: Nov. 23, 1999

[54] DOUBLE ACTION COMPACTOR WITH FIXED SUB-COMPARTMENTS

[76] Inventor: Claude Boivin, 7255 Du Mousset, Quebec City, Quebec, Canada, G2K 1Z7

[21] Appl. No.: 09/035,895

[22] Filed: Mar. 6, 1998

Related U.S. Application Data

[63] Continuation of application No. 08/445,763, May 22, 1995, abandoned, which is a continuation-in-part of application No. 08/343,822, Nov. 3, 1994, Pat. No. 5,421,689, which is a continuation of application No. 08/044,754, Apr. 12, 1993, abandoned.

[51] Int. Cl.⁶ .................................................. B65G 67/04
[52] U.S. Cl. ........................ 414/487; 100/100; 100/193; 100/221; 296/37.6; 414/409; 414/525.6; 414/679
[58] Field of Search ..................................... 414/406–409, 414/509–517, 525.1, 679, 486, 487, 525.6, 525.2; 296/101, 37.6; 100/100, 193, 221, 225; 220/909

[56] References Cited

U.S. PATENT DOCUMENTS

| 2,488,066 | 11/1949 | Reuter et al. | 414/510 X |
| 4,051,969 | 10/1977 | Homanick | 414/679 |
| 4,234,286 | 11/1980 | Hamilton | 414/512 X |
| 4,681,360 | 7/1987 | Peters et al. | 296/37.6 |
| 4,705,315 | 11/1987 | Cherry | 296/37.6 X |
| 4,909,558 | 3/1990 | Roshinsky | 296/37.6 |
| 4,915,570 | 4/1990 | Roth et al. | 414/487 X |
| 4,936,735 | 6/1990 | Ryan | 414/679 |
| 5,102,150 | 4/1992 | Finley | 296/37.6 |
| 5,122,025 | 6/1992 | Glomski | 414/517 X |

FOREIGN PATENT DOCUMENTS

| 1264702 | 1/1990 | Canada | 414/406 |
| 2263093 | 7/1993 | United Kingdom | 414/679 |

Primary Examiner—David A. Bucci
Attorney, Agent, or Firm—David J. French

[57] ABSTRACT

A refuse collection vehicle having multiple compartments for recyclable material is provided with a compacting assembly that includes a sub-compartment that does not change in size during compaction operations.

5 Claims, 9 Drawing Sheets

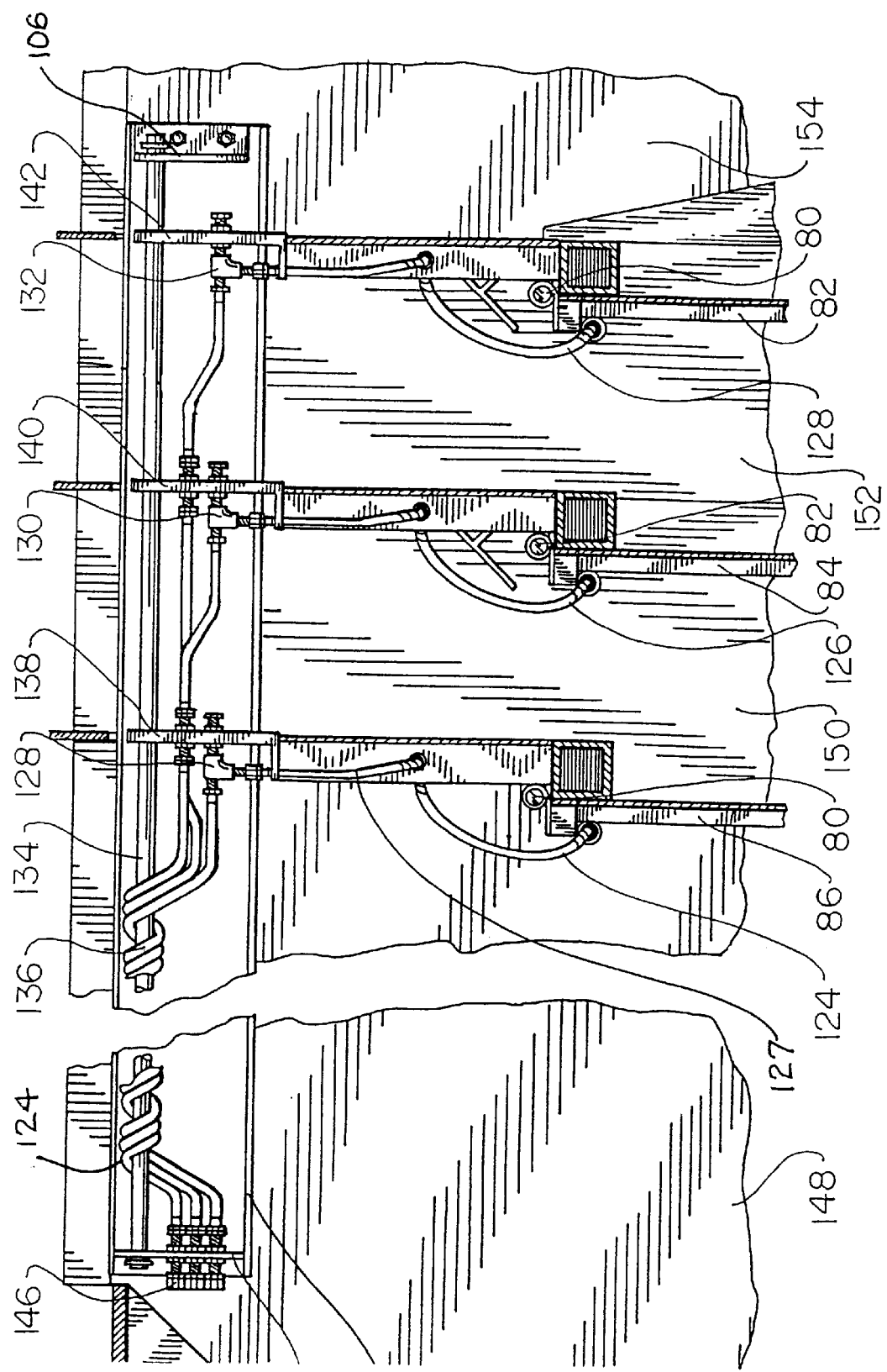

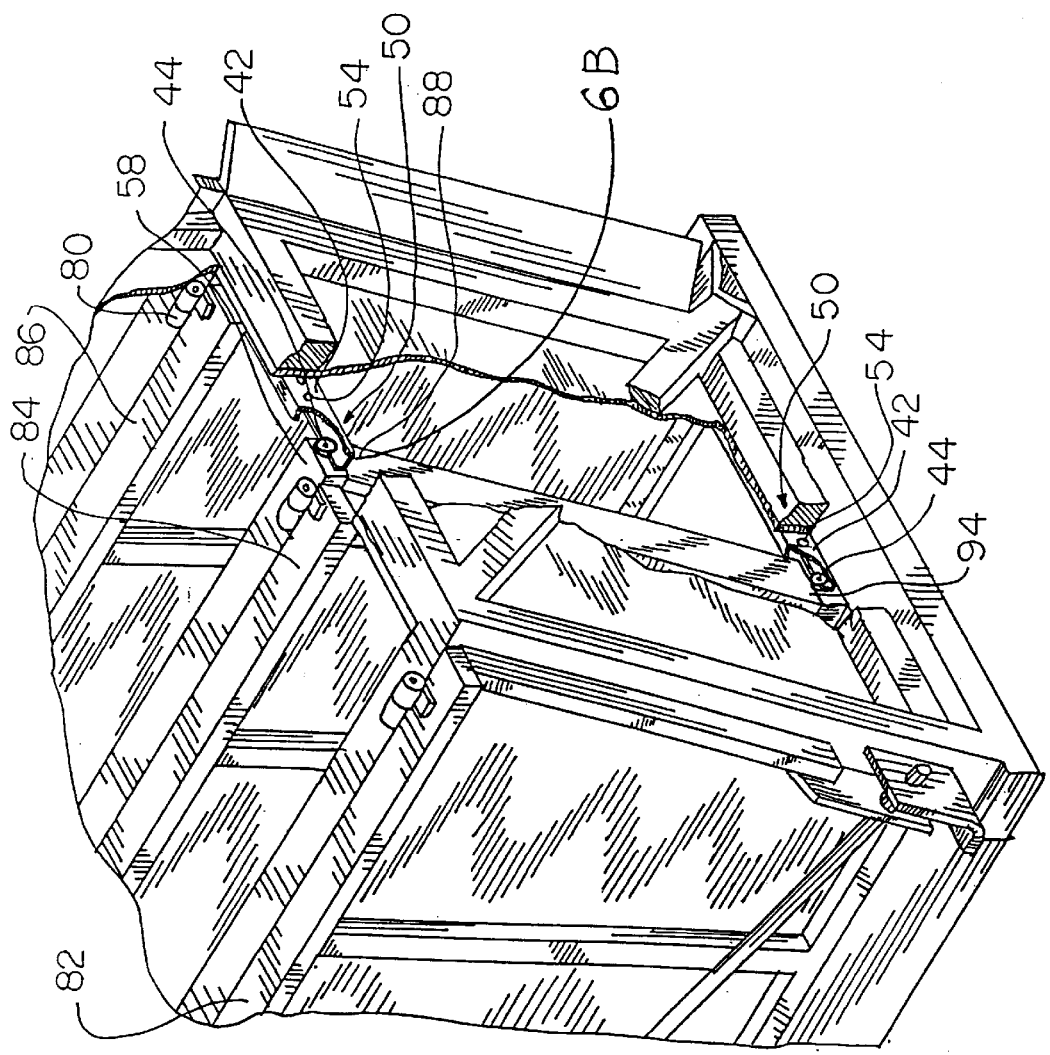

DOUBLE ACTION COMPACTOR WITH FIXED SUB-COMPARTMENTS

This invention is a continuation of application Ser. No. 08/445,763 filed May 22, 1995, now abandoned which is continuation-in-part of application Ser. No. 08/343,822 filed Nov. 3, 1994, now U.S. Pat. No. 5,421,689, which patent is a continuation of application Ser. No. 08/044,754 filed Apr. 12, 1993, now abandoned.

FIELD OF THE INVENTION

This invention relates to the field of collection and compaction of refuse and recyclable substances. In particular it relates to a waste collecting vehicle having specific zones of compaction and non-compaction.

BACKGROUND TO THE INVENTION

In the gathering of recycled materials known systems do not address the need for compaction of compactible materials and the non-compaction of other materials such as glass.

Prior art patents relating to compaction systems for recycling trucks include the following references.

U.S. Pat. No. 5,122,025 Glomski, Jun. 16, 1992, shows a mobile interior wall, moveable towards the front and back of the collection bin and creating two compaction zones inside a waste collecting vehicle. This system does not provide more than two compaction zones for recycling materials.

U.S. Pat. No. 5,078,567 Lombardo, Jan. 7, 1992, shows a waste collecting vehicle equipped with multiple compartments to receive and discharge separately some recycling materials. The recycling materials are charged into compartments by means of openings situated on the side. This system does not provide compaction zones which would permit the storage of a large quantity of recycling materials.

U.S. Pat. No. 4,979,866 Croy, Dec. 25, 1990, shows a waste collecting vehicle for garbage or for recycling materials equipped with multiple compartments and with a transverse compacting unit. This system is relatively complex since it holds a receptive compartment and a compaction compartment joined by a corridor.

U.S. Pat. No. 4,840,532 Dinneen, Jun. 20, 1989, shows a waste collecting vehicle holding four compartments. These compartments are not of a variable volume nor do they include a compactor.

U.S. Pat. No. 5,421,689, Boivin, filed Apr. 12, 1993, of which the present application is a Continuation-in-part, included provision for a waste collecting vehicle for recycling materials holding two compactor compartments but this disclosure does not include non-compactor compartments to receive non-compactible recycling materials.

A need exists for a vehicle having in combination both compactor and non-compaction compartments. There is also a need for provision in such a vehicle whereby the volume of the non-compacting sub-compartments may be adjusted by the operator according to the needs of a given refuse collection environment. This invention addresses these needs.

A further objective is to provide a waste collecting vehicle wherein the volume of the non-compactor compartments may be manually adjusted by the operator by manually displacing walls.

The invention in its general form will first be described, and then its implementation in terms of specific embodiments will be detailed with reference to the drawings following hereafter. These embodiments are intended to demonstrate the principle of the invention, and the manner of its implementation. The invention in its broadest and more specific forms will then be further described, and defined, in each of the individual claims which conclude this Specification.

SUMMARY OF THE INVENTION

It is a feature of the present invention to provide a waste collecting vehicle comprising at least two compartments, at least one of which does not undergo compaction while compaction is occurring in another compartment.

Thus, according to one general aspect of the invention the bin of a compacting collection vehicle is provided with a displaceable compacting assembly wherein the compacting assembly contains at least one sub-compartment that does not change in its dimensions with the displacement of the compactor assembly.

The bin of the collection vehicle may have dual compaction compartments and two or more sub-compartments may be present in the compacting assembly. If at least two sub-compartments are present, the dividing wall between the two adjacent sub-compartments may be displaceable within the compactor assembly to vary the dimension of the non-compacting sub-compartments.

To facilitate the controlled removal of collected material contained within the various compartments formed within the bin, the walls separating the compartments may be provided with swinging doors, the doors being progressively smaller in size proceeding towards the rear, dumping end of the vehicle. This permits the doors to swing through the door frames of adjacent sub-compartment walls when the bin is elevated to tip-out its contents.

The various compartments within the bin may be filled by a charging system through overhead openings, either from fore or aft on the vehicle, or laterally from the side. The compartments are intended to be selectively filled with sorted materials that are separated when introduced into the charging system.

The foregoing summarizes the principal features of the invention and some of its optional aspects. The invention may be further understood by the description of the preferred embodiments, in conjunction with the drawings, which now follow.

SUMMARY OF THE FIGURES

FIG. 5 is a partial sectional side view taken according to line 5—5 of FIG. 3;

FIG. 6A shows a partially cut-away perspective view showing an enlargement of the compactor assembly shown in FIG. 2;

DESCRIPTION OF THE PREFERRED EMBODIMENT

Figure 1:
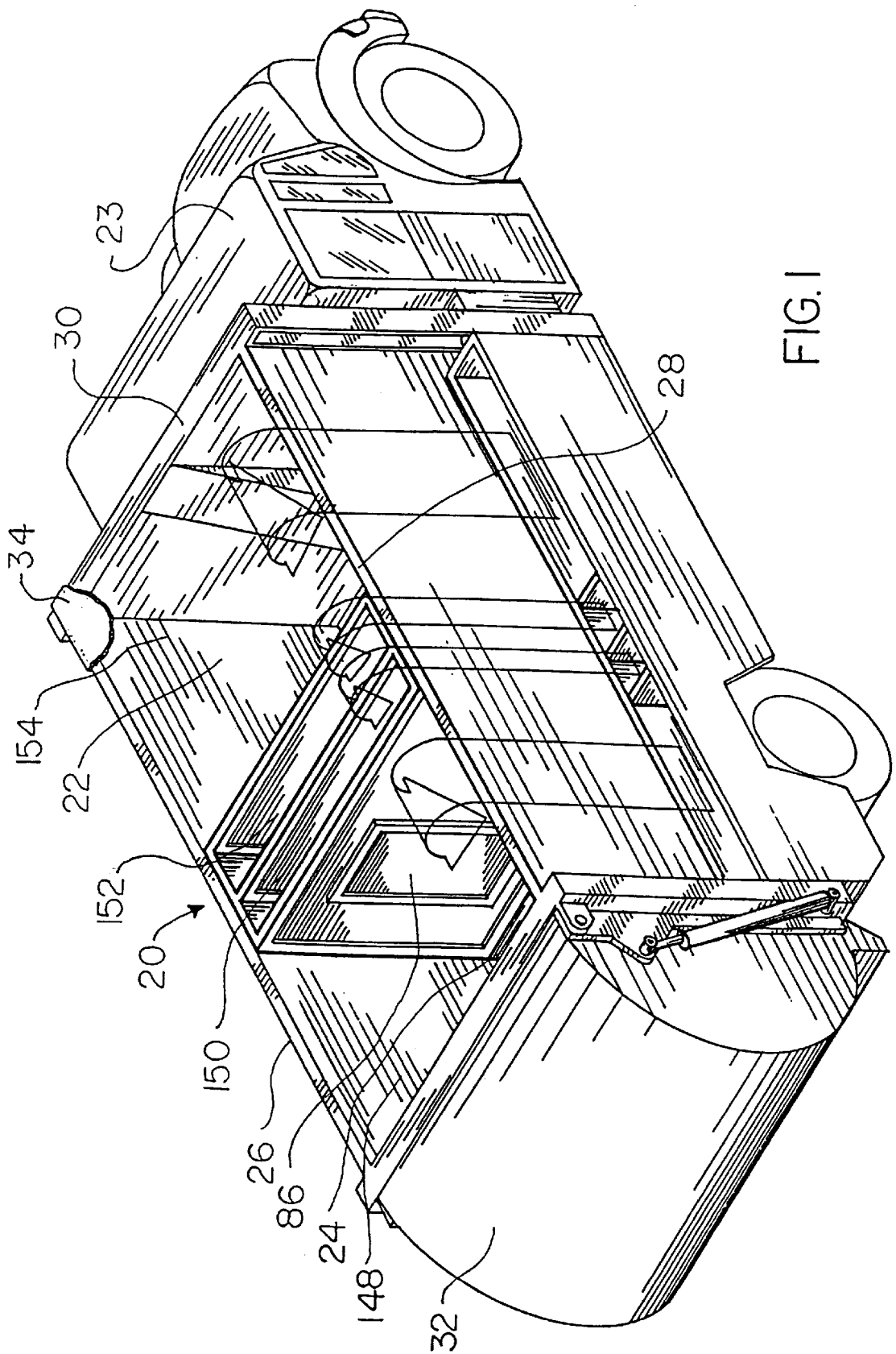
FIG. 1 is a perspective view of a double action compartmented compactor system installed in a bin in a truck.

In FIG. 1 a waste collecting vehicle 23 is provided with a double action compacting assembly or compactor 20 with sub-compartments 150,152 mounted inside a bin 22. The bin 22 is provided with a main bin floor 24, a right side 26 (as would be showing from a front view of the vehicle), a left side 28, a front end 30, a back door 32 and a ceiling 34 shown in partial cut-away view.

The mobile compartments of the double action compactor 20 can be displaced at their base along the rails 36 by a hydraulic cylinder 40. The hydraulic cylinder 40 displaces the mobile compartments from the front end 30 towards the rear door 32 and from the rear door 32 towards the front end 30 in order to compact the recycling materials comprised in the respective front and back compartments 154,148. During the compacting operation, the volumes of the first and second non-compacting sub-compartments 150,152 do not vary nor do they undergo compaction.

Figure 2:
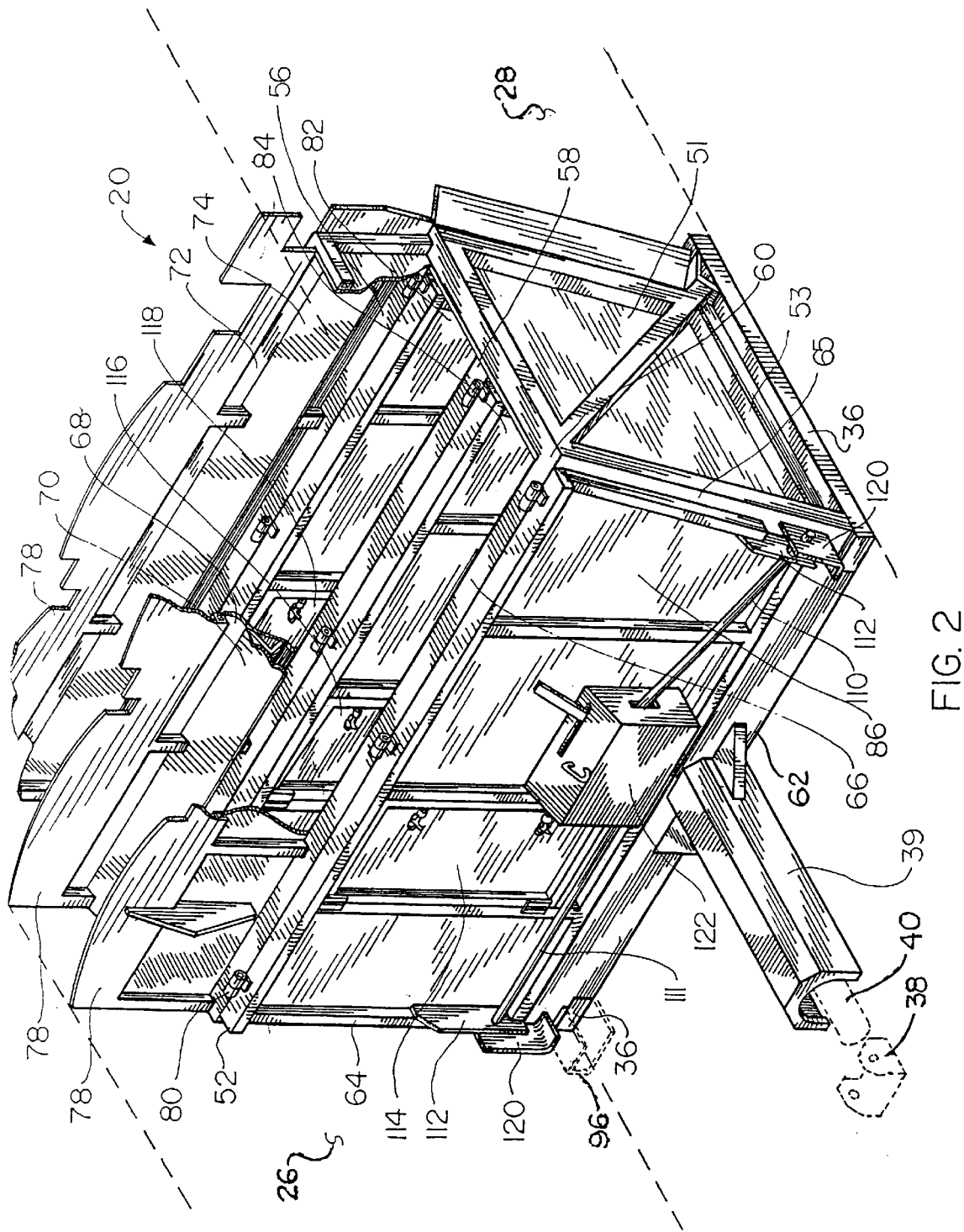
FIG. 2 is an enlarged view in the compaction assembly in the center of the bin of FIG. 1.

In FIG. 2, one can see a detailed view of the compaction mechanism where the main bin floor 24, is bounded by two rails 36, respectively located at the right side 26 and the left side 28 of the bin 22. Underlying the compacting assembly floors is a hydraulic cylinder 40 covered by a deflector-protector 39 (to prevent the damages to the cylinder 40) attached to anchor plate 38 on the bin floor 24. Both rails 36 are inserted in sliding channels 96.

Within the bin 22 the double action compactor 20 has internal non-compacting compartments 150,152 defined by a right and left walls 51,52 transversely joined by the compactor floor 53. A first internal transverse frame 56 is located in the compactor 20 towards the front end 30 of the bin 22. A second frame 58 is located at the center of the double action compactor 20. And a third frame 60 is located towards the back door 32, the three frames preferably being of trapezoidal shape.

The first and the third frames 56,60 are themselves built-up by a lower beam 62, two side beams 64 and 65 and a superior beam 66. The superior beam 66 is longer than the lower beam 62 to provide a trapezoidal shape. The second frame 58 comprises the two side beams 64 and 65 and the superior beam 66. The side beams 64 and 65 of the second frame 58 each carry a large extension 68 equipped with a first deflector 70. The side beams 64 and 65 of the first frame 56 each carry a medium extension 72 equipped along all of its length with a second deflector 74. The first, second and third frames 56,58,60 are all surmounted each by a selective header 78 having contact with the ceiling 34.

The superior beams 66 of the first, second and third frames 56,58,60 are each equipped with three hinges 80 respectively joining the tops of first, second and third swinging doors 82,84,86. Access doors 114, 116 and 118 are respectively provided on the third, second and first swinging doors 86,84,82 to permit personnel to have access to the different compartments for inspection and other tasks requiring access to the bin 22.

Locking rods 110,111 cross through a door locking bridle 112 fixed at each side of each door, terminating at a frame locking bridle 120 fixed on all the door frames. A mechanism box 122 with manual handle is fixed on each door to allow manual opening of the doors in case of damage to the pneumatic system referenced below.

Figure 3:
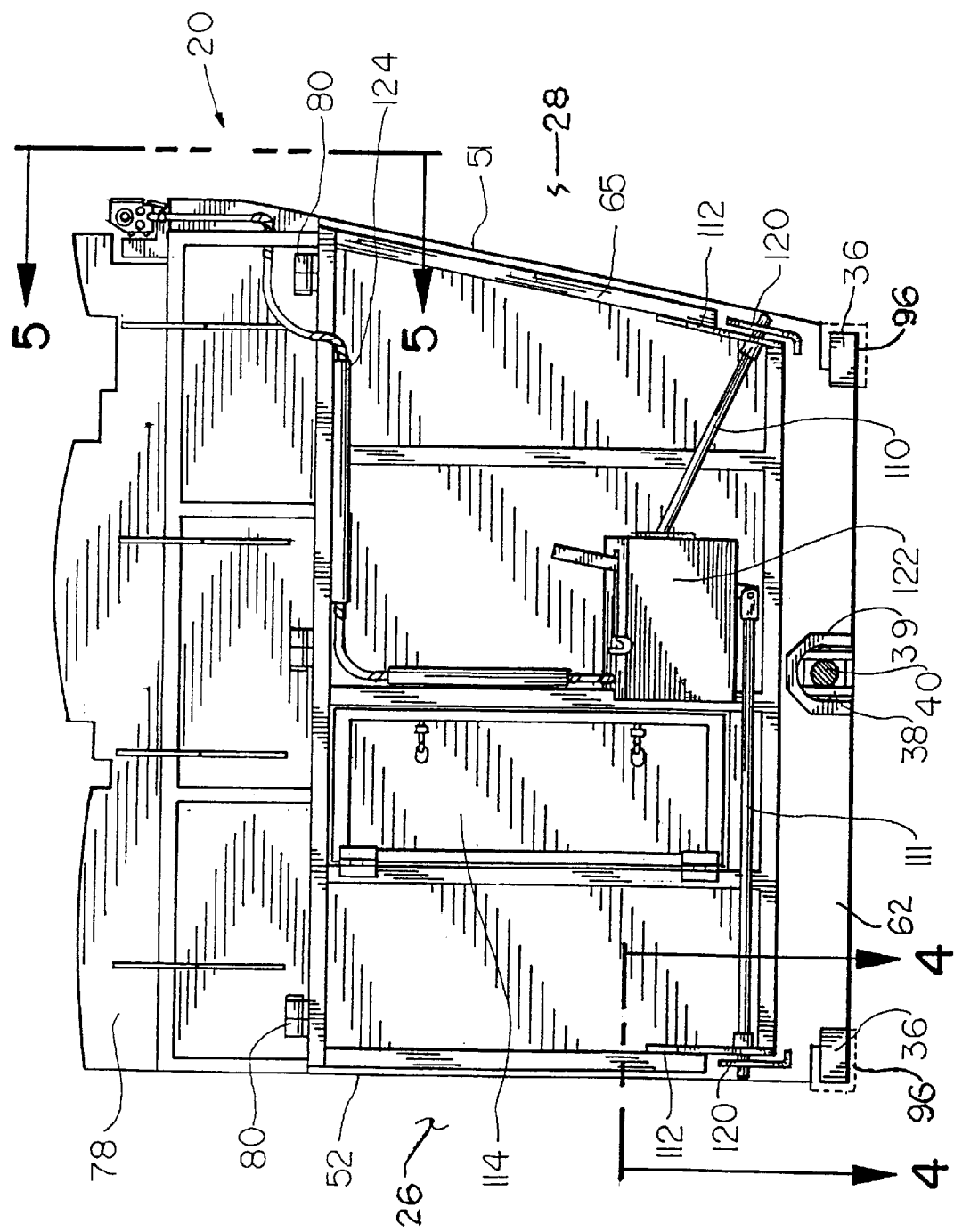
FIG. 3 is a face view of a partition of the compacting assembly of FIG. 1.

FIG. 3 shows the third swinging door 86 in face view with the different components it carries. A pneumatic linkage 124 allows opening or locking the swinging door 86 automatically and at a distance. This pneumatic linkage 124 extends from the mechanism box 122 to connect to the pneumatic supply of the vehicle.

Figure 4:
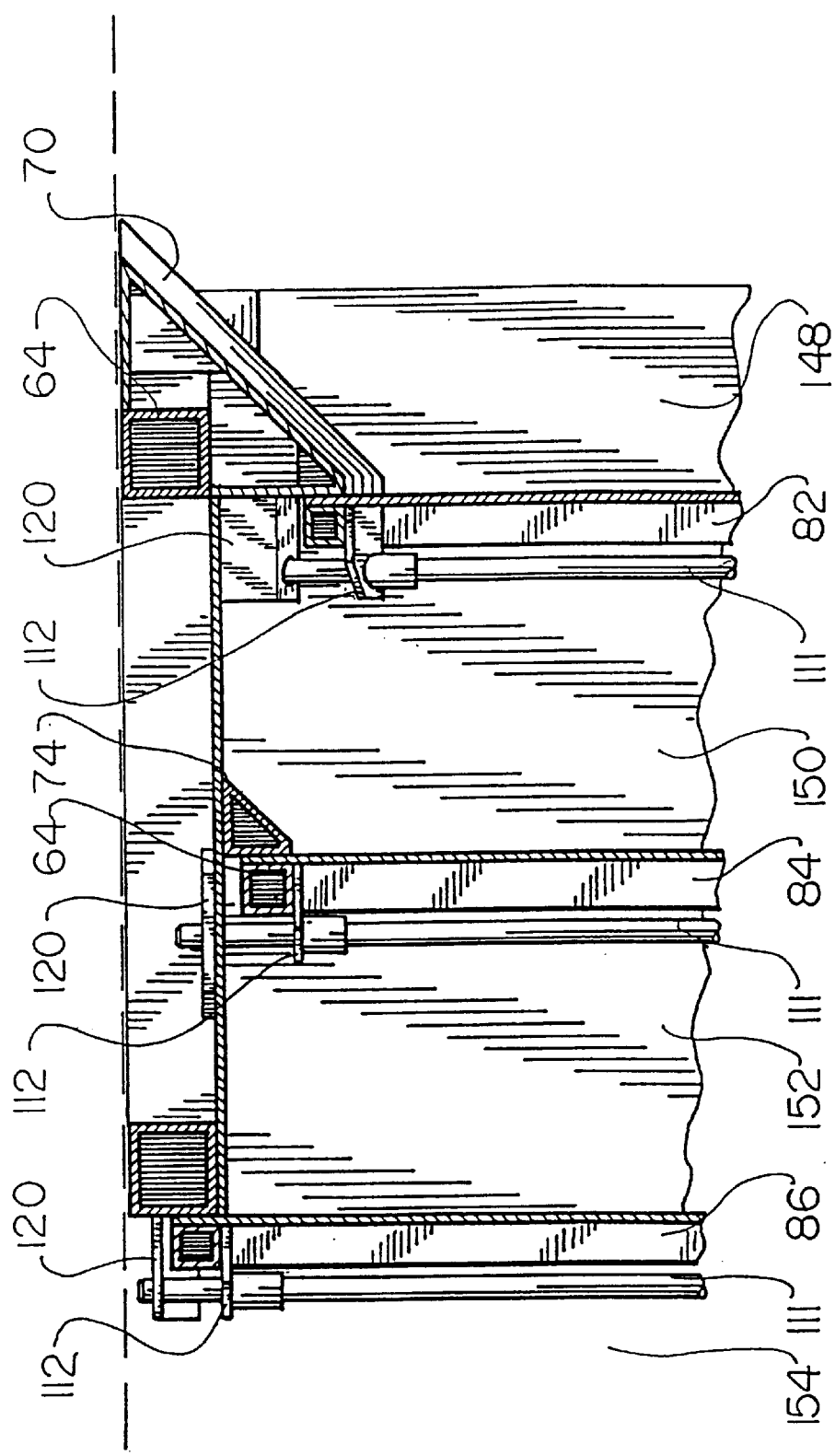
FIG. 4 is a partial sectional top view taken according to line 4—4 of FIG. 3.

FIG. 4 shows a transverse vertical cross-section looking downwardly through a series of swinging doors, each with its own anchoring and locking system. FIG. 4 shows more particularly a cut view where one can see a first deflector 70 where it rests against the first swinging door 82 which separates forward compartment 148 from sub-compartment 150. The horizontal locking rod 111, which passes across the door locking bridle 112 and through the frame locking bridle 120 is located behind the door 82. The second swinging door 84 also has a horizontal locking rod 111 and the locking bridles 112 and 120 as well as a second deflector 74. The second door 84 separates the sub-compartment 150 from sub-compartment 152. In turn, the third swinging door 82 is as well provided with a horizontal locking rod 111, and the locking bridles 112 and 120. This third swinging door 82 separates sub-compartment 152 and rearward compartment 154.

The first door 82 is smaller than the second door 84. The second door 84 is also smaller than the third door 86. This precaution is taken because during the unloading, the inclination of the bin 22 (FIG. 7B) causes the different doors, when unlocked, to swing through the frame of the next adjacent door. In order not to constrain this motion of the doors it is necessary to reduce their dimensions so they do not collide with the frame of the following door.

FIG. 5 shows a sectioned side view of the compactor 30 with the linkages of the pneumatic system used to open and close the doors. A protective railing shields a hose translation rod 134 which carries pneumatic linkages 124. The translation rod 134 is supported between rod anchoring plates 106. The main flexible pneumatic hoses 136 are displaced along this translation rod 134 when the double action compactor 20 is compacting. These hoses terminate at quick connections 146 for joining to a compressor or other source of compressed air. The main flexible portions of pneumatic hoses 136, are "corked" around the translation rod 134 to permit the hoses to stay rectilinear during their displacement and to stay protected at all times.

One of the hose linkages 127 is joined through pneumatic distributor 128 to a second pneumatic linkage 124 which activates the horizontal and inclined locking rods 111 and 110 of the last door 86. Similarly, the two other main flexible linkages 136 go through support plates 138,140 to join other pneumatic distributors 130,132 and other pneumatic linkages 126,128 which have the task of unlocking the locking rods 111 and 110.

Figure 6B:
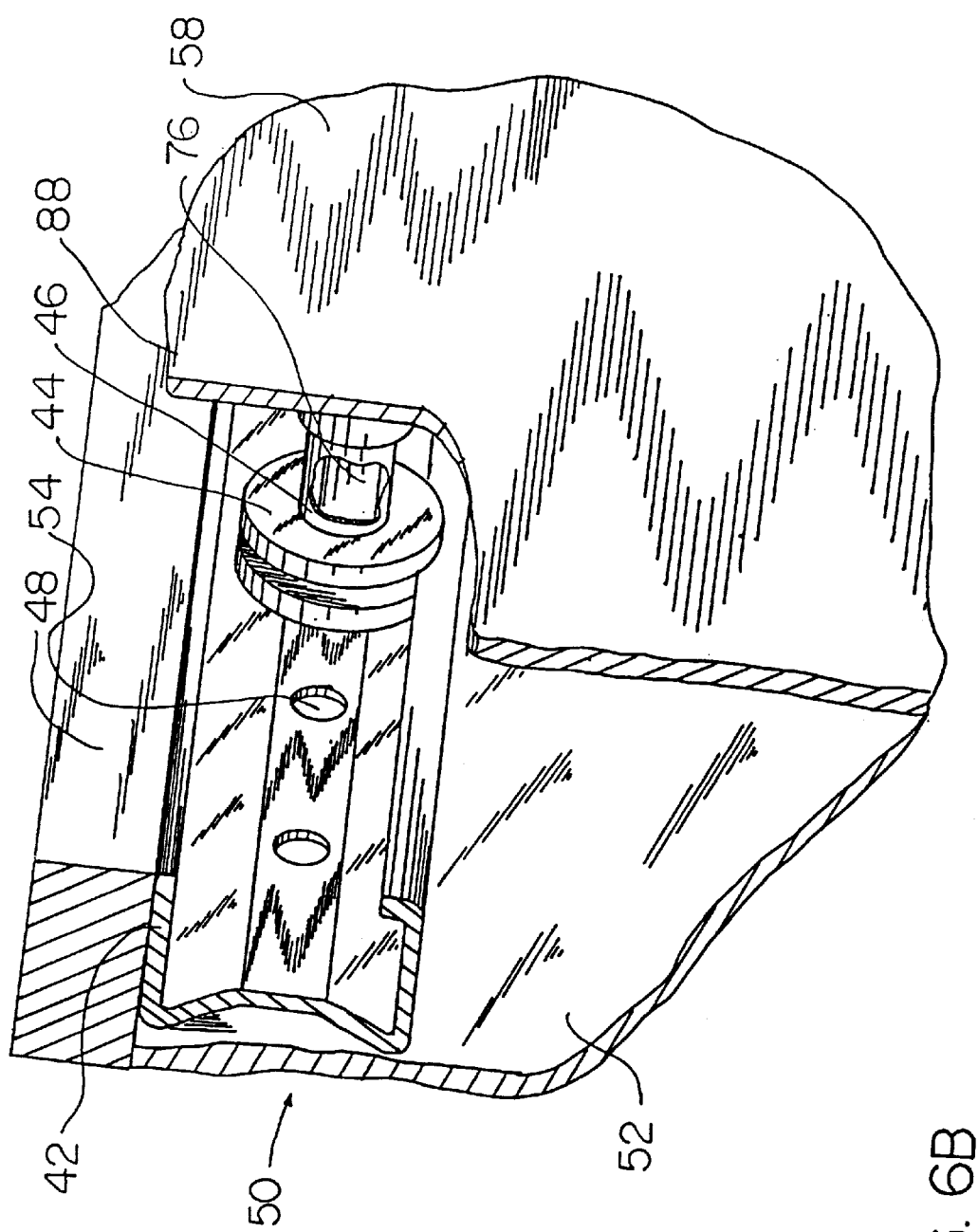
FIG. 6B shows an enlarged detail in the region of arrow 6B of FIG. 6A.

FIGS. 6A and 6B show means for making the two non-compacting sub-compartments 150,152 adjustable in size. The second swinging door 84 which is used as a median wall may be displaced manually so as to vary the respective volumes of the non-compactible sub-compartments 150, 152.

FIG. 6A shows a detail of second frame 58 of FIG. 2 illustrating a rolling system 50 for permitting an adjustment of the capacity of the non-compactible compartments 150, 152. This rolling system 50 comprises rolling rails 42 fixed to the left and right walls 52,51 of the compactor 20 and positioned under the bin frame 48 of the bin 22. A wheel 44 is fixed by means of an axle 46 and joined to the second frame 58. The upper corners 88 of both sides of the second frame 58 possesses a similar rolling system 50. Each wheel 44 (FIG. 6B) possesses, in its axle 46, an indexing rod 76 aimed at maintaining the second frame 58 in place by being inserted within indexing holes 54 located on respective rolling rails 42. Optionally, the indexing rod 76 of the lower corners (not shown) can be unlocked pneumatically while those at the higher corner braces 88 are done manually.

During the adjustment of the second frame 58 to distribute the non-compactible volume between the different non-compactible sub-compartments 150,152, the indexing rods 76 are unlocked and the second frame 58 becomes then mobile and may be manually moved, with the help of wheels 44, on the rolling rails 42, into position and fixed in place by causing the indexing rod 76 to be inserted into the required indexing hole 54.

Figure 7A:
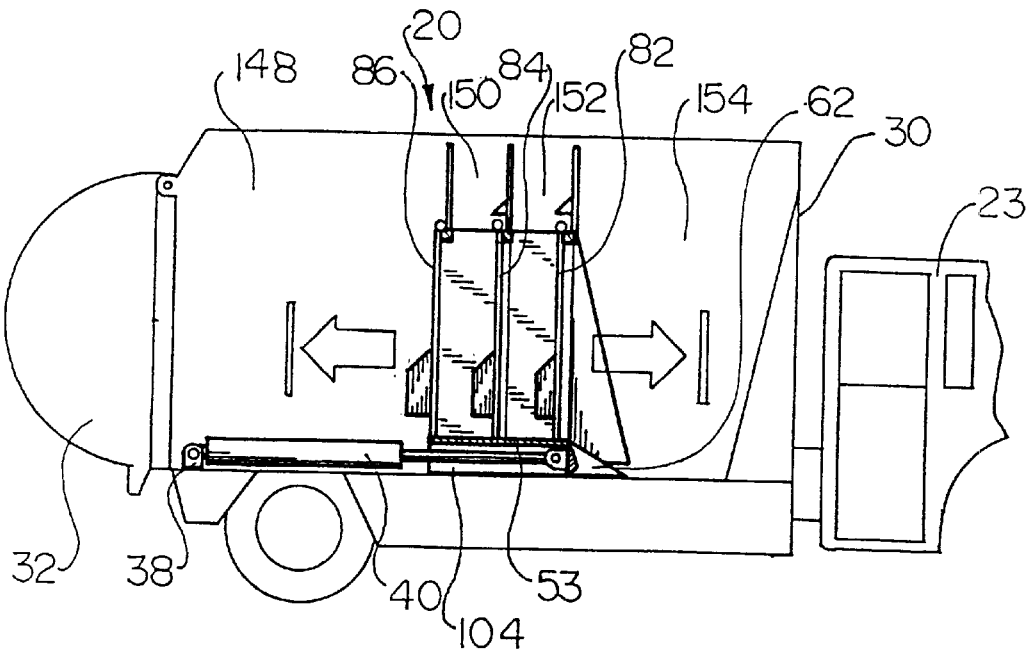
FIG. 7A is a schematic depiction of a cross-sectional view of the bin with arrows showing a rectilinear movement of the compacting assembly.
Figure 7B:
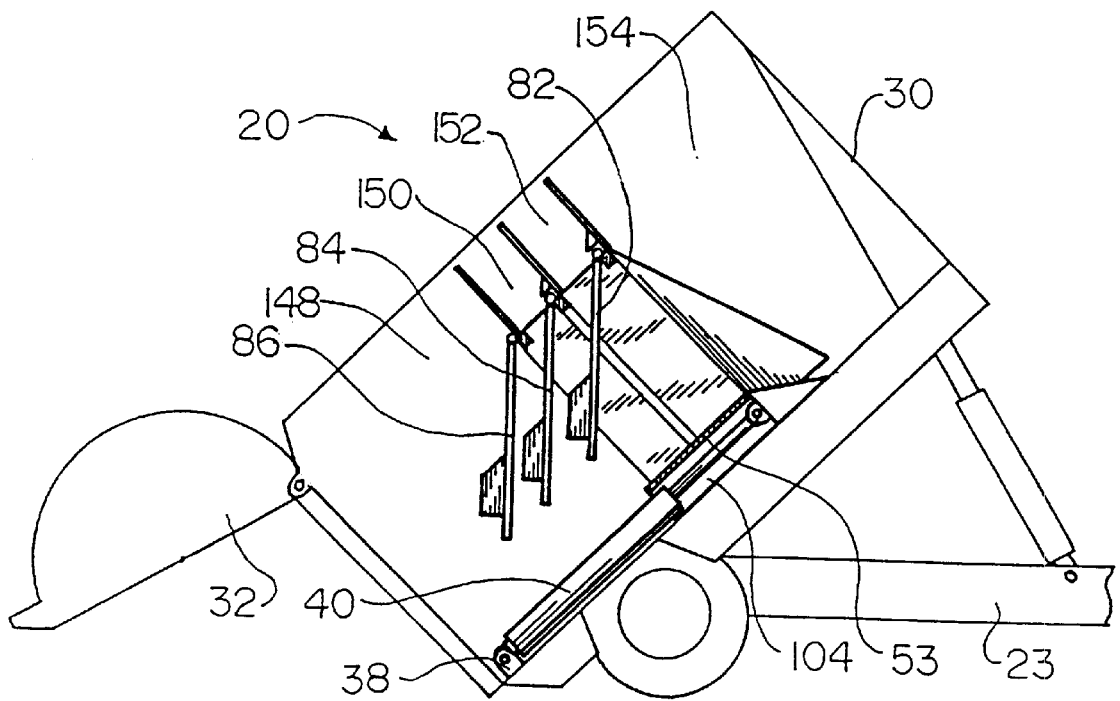
FIG. 7B is a view of the loading bin of FIG. 7A in an elevated unloading position.

FIGS. 7A and 7B show how the first, second and third swinging doors 82,84,86 define four compartments 148,150, 152,154 inside the bin 22. A back compartment 148, that can be compacted, is limited at its extremities by the rear door 32 and the third swinging door 86. A first non-compacting sub-compartment 150 is limited by the third swinging door 86 and the second swinging door 84. A second non-compacting sub-compartment 152 is limited by the second swinging door 84 and the first swinging door 82. And a front compartment 154, that can be compacted, is limited by the first swinging door 82 and the front end 30 of the bin 22. The first and second non-compacting compartments 150,152 form the rigid mobile compartments of the double action compactor 20.

Displacement of the compacting assembly 20 occurs as follows. The compactor floor 53 is located between the lower beams 62 of the first and third frames 56,60. The lower beam 62 has a semi-cylindrical passageway 104 formed therein in order to let pass the hydraulic cylinder 40. The hydraulic cylinder 40 is connected to the lower beam 62 of the first frame 56 permitting the rigid compartments be displaced towards the front end 30 or towards the rear door 32. The action of the cylinder 40 when the compartments 148 and 154 are compacted is shown in FIG. 7B, wherein the bin 22 is in a discharge position with the three swinging doors 82,84,86 opened for discharge.

Figures 8A, 8B:
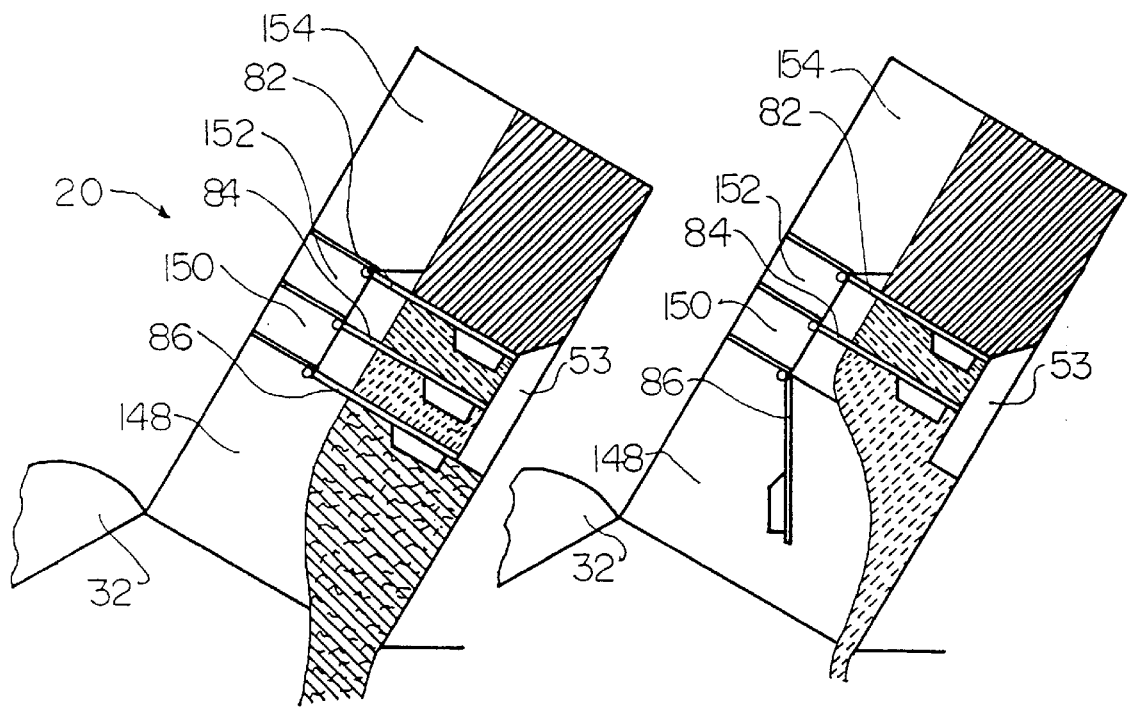
FIGS. 8A, B, C, D are views showing the unloading sequence from the different compartments identified in FIG. 7A.
Figures 8C, 8D:
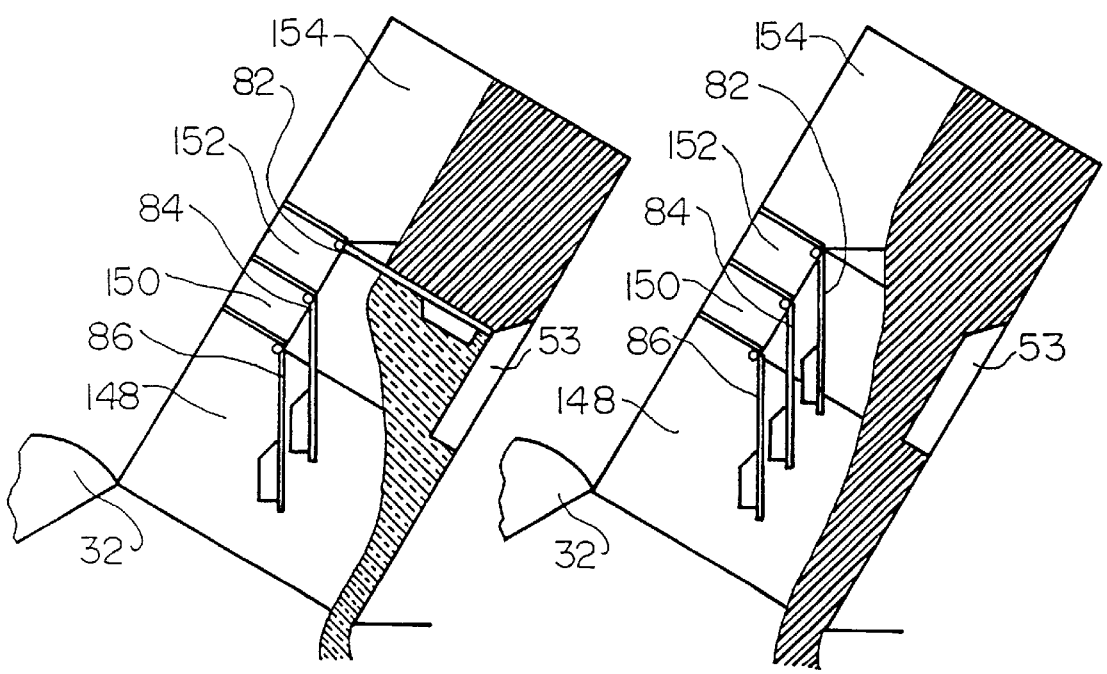

FIGS. 8A, B, C and D show the different steps that enter into the discharge of the different compartments. First the rear door 32 is opened and the back compartment 148 is emptied. The vehicle may then move to another station and the third swinging door 86 may be opened to empty the first middle compartment 150. Moving again, the opening of the second door 84 empties the second middle compartment 152. Finally opening the last swinging door 82 empties the front compartment 154. The emptying cycle ends by the lowering of the bin 22, closing the back end 32 and locking of the doors 82,84,86.

It is an additional feature of this invention that an operator may vary the volume of the different recycling sub-compartments 150,152 by manually displacing and repositioning the second frame 58. The displacement of this frame 58 permits varying the volume of the sub-compartments 150,152 according to the volume of non-compactible garbage to be recovered. Notwithstanding the shifting of the second frame 58, the compaction system always functions the same way in the compacting of the back and front main bin compartments 148,150.

As a further modification one may install the hydraulic cylinder 40 below the bin floor level in a channel formed in the floor of the central rearward portion part of the bin 22. The channel so defined can serve as a guide for two inter-facing C-type channels carried along the bottom of the compacting assembly 20 to guide the compaction system during its displacement. This option facilitates the unloading of paper type of materials, should they be placed in front compartment 154.

While a compaction system has been shown that provides for double-action compaction in two compartments 148,154, extended travel to effect substantial compaction need only be provided in one compartment. Similarly, the compacting assembly 20 need only have a single sub-compartment. Conversely, more than two sub-compartments may be present, and two or more dividing walls between sub-compartments may be displaceable.

CONCLUSION

The foregoing has constituted a description of specific embodiments showing how the invention may be applied and put into use. These embodiments are only exemplary. The invention in its broadest, and more specific aspects, is further described and defined in the claims which now follow.

These claims, and the language used therein, are to be understood in terms of the variants of the invention which have been described. They are not to be restricted to such variants, but are to be read as covering the full scope of the invention as is implicit within the invention and the disclosure that has been provided herein.

I claim:

1. A collection vehicle having a principal bin divided by a displaceable compacting assembly, wherein the compacting assembly includes a sub-compartment which does not change in its dimensions during displacement of the compacting assembly.

2. A collection vehicle as in claim 1 wherein the bin has a forward end and a dumping end and the compacting assembly has multiple sub-compartments, the sub-compartments being separated by sub-compartment walls containing lockable swinging doors, said swinging doors being progressively smaller in width proceeding towards the dumping end of the bin.

3. A collection vehicle as in claim 2 wherein at least two of said sub-compartments are divided by a sub-compartment wall which is displaceable within the compacting assembly to permit variation in the dimensions in the said at least two sub-compartments.

4. A collection vehicle as in claim 2 wherein said sub-compartments are accessible from their top regions and the vehicle is provided with laterally located charging means to separately charge materials into the respective sub-compartments.

5. A collection vehicle as in claim 3 wherein said sub-compartments are accessible from their top regions and the vehicle is provided with laterally located charging means to separately charge materials into the respective sub-compartments.

* * * * *